(12) United States Patent
Larsson et al.

(10) Patent No.: US 11,583,934 B2
(45) Date of Patent: Feb. 21, 2023

(54) ANVIL WITH CURVED PASSAGE FOR CUTTING TOOL

(71) Applicant: SECO TOOLS AB, Fagersta (SE)

(72) Inventors: Andreas J. Larsson, Arboga (SE); Bjorn Gustafsson, Arboga (SE)

(73) Assignee: SECO TOOLS AB, Fagersta (SE)

( * ) Notice: Subject to any disclaimer, the term of this patent is extended or adjusted under 35 U.S.C. 154(b) by 369 days.

(21) Appl. No.: 16/465,699

(22) PCT Filed: Nov. 17, 2017

(86) PCT No.: PCT/EP2017/079574
§ 371 (c)(1),
(2) Date: May 31, 2019

(87) PCT Pub. No.: WO2018/099733
PCT Pub. Date: Jun. 7, 2018

(65) Prior Publication Data
US 2019/0308250 A1    Oct. 10, 2019

(30) Foreign Application Priority Data
Dec. 1, 2016   (EP) .................................. 16201718

(51) Int. Cl.
*B23B 27/10*   (2006.01)
(52) U.S. Cl.
CPC .......... *B23B 27/10* (2013.01); *B23B 2205/16* (2013.01)

(58) Field of Classification Search
CPC ..... B23B 27/10; B23B 27/16; B23B 27/1618; B23B 2205/16; B23B 2250/12
See application file for complete search history.

(56) References Cited

U.S. PATENT DOCUMENTS

| | | | |
|---|---|---|---|
| 4,535,216 A * | 8/1985 | Cassidenti | B23B 27/10 219/68 |
| 4,757,307 A * | 7/1988 | Keramati | B23Q 11/10 340/680 |
| 5,799,553 A | 9/1998 | Billatos | |
| 7,322,776 B2 * | 1/2008 | Webb | C23C 30/005 407/113 |
| 8,137,034 B2 * | 3/2012 | Noureddine | B23B 29/04 407/11 |
| 8,454,274 B2 * | 6/2013 | Chen | B23B 27/10 407/11 |
| 10,307,827 B2 * | 6/2019 | Imai | B23Q 11/10 |
| 10,654,116 B2 * | 5/2020 | Kawasaki | B23B 29/22 |
| 10,710,166 B2 * | 7/2020 | Nagae | B23B 27/1614 |
| 11,065,693 B2 * | 7/2021 | Hirano | B23B 27/10 |
| 2002/0106250 A1 * | 8/2002 | Murakawa | B23B 27/10 407/11 |
| 2011/0020072 A1 | 1/2011 | Chen et al. | |

(Continued)

FOREIGN PATENT DOCUMENTS

| | | |
|---|---|---|
| CN | 103962593 A | 8/2014 |
| DE | 3004166 A1 | 8/1980 |

(Continued)

*Primary Examiner* — Nicole N Ramos
(74) *Attorney, Agent, or Firm* — Corinne R. Gorski

(57) ABSTRACT

An anvil for a cutting tool includes an anvil body. A curved passage extends from an inlet opening in the anvil body to an outlet opening in the anvil body. The anvil body can be made by an additive manufacturing process.

11 Claims, 6 Drawing Sheets

(56) References Cited

U.S. PATENT DOCUMENTS

2014/0079495 A1* 3/2014 Chen .................... B23B 27/164
                                                            407/11
2016/0175938 A1   6/2016 Kaufmann

FOREIGN PATENT DOCUMENTS

| EP | 1864748 A1 | 12/2007 |
| EP | 2946857 A1 | 11/2015 |
| JP | H05301104 A | 11/1993 |
| JP | 2003266207 A | 9/2003 |
| WO | 2008088628 A1 | 7/2008 |

* cited by examiner

US 11,583,934 B2

ANVIL WITH CURVED PASSAGE FOR CUTTING TOOL

RELATED APPLICATION DATA

This application is a § 371 National Stage Application of PCT International Application No. PCT/EP2017/079574 filed Nov. 17, 2017 claiming priority to EP 16201718.0 filed Dec. 1, 2016.

BACKGROUND AND SUMMARY

The present invention relates generally to anvils for cutting tools and, more particularly, to such anvils having fluid passages therein.

Cutting tools for modern metal cutting and other machining operations typically include toolholders with replaceable cutting inserts. The cutting inserts are typically made of much harder materials, such as sintered, cemented carbide, than the toolholders. The cutting inserts are typically clamped in recesses provided in the toolholders for the cutting inserts. Often, an anvil (sometimes referred to as a shim) is provided in the recess between the bottom surface of the recess and the bottom surface of the cutting insert. One purpose for providing an anvil is to position the cutting edge(s) of the cutting insert relative to the toolholder in a desired fashion.

Because of high temperatures generated during cutting operations, it is often desirable to provide cooling and/or lubricating fluid near the cutting edge of the cutting insert. It is also often desirable to provide fluid for removing of chips generated at the workpiece by the cutting operation. One technique for providing fluid for cooling, lubricating, and/or flushing is to position a nozzle above the cutting edge so that fluid can be directed at the cutting edge. This arrangement is disadvantageous in that it requires additional equipment and is difficult to use in applications involving small tools or workpieces. It is also largely limited to turning applications where the tool is not rotating, and is difficult or impossible to use in applications such as milling operations.

Another technique for providing fluid for cooling, lubricating, and/or flushing is to direct fluid through passages in the toolholder and, in some instances, through passages in the cutting insert. EP2946857A1 shows a turning tool holder and cutting insert with an anvil having a passage extending therethrough for introducing fluid to the cutting edge.

It is desirable to provide an anvil for a cutting tool with a passage having a complex geometry to facilitate providing fluid through the anvil. It is also desirable to be able to produce such an anvil by a simple, accurate technique.

According to an aspect of the present invention, an anvil for a cutting tool comprises an anvil body, wherein a curved passage extends from an inlet opening in the anvil body to an outlet opening in the anvil body.

A curved passage in an anvil provides options for providing fluid to cool and/or lubricate a cutting insert, and/or flush chips away from a workpiece that are not possible or are only possible via passages in the anvil having complex geometries when passages extend along straight lines. The anvil provides additional geometry options for providing a coolant/lubrication/flushing beam from below a cutting insert without advanced drilling or blind plugging operations.

The anvil itself is applicable to most cutting insert clamping systems. The anvil can be manufactured at different thicknesses, depending on what is most suitable for the cutting insert shape. The anvil can, if desired, extend fully through the cutting toolholder to the bottom surface of the toolholder.

According to another aspect of the invention, the anvil comprises a top surface, a bottom surface, and a side surface between the top surface and the bottom surface, the side surface comprising at least three side surface portions and at least three corner portions, each corner portion of the at least three corner portions being disposed between respective pairs of side surface portions of the at least three side surface portions, at least one corner portion of the at least three corner portions comprising a surface that extends radially outward from a central axis of the anvil relative to extensions of a respective pair of side surface portions of the at least three side surface portions, the central axis extending between the top surface and the bottom surface. By providing such a structure, a limited portion of the top surface of the anvil can extend past a bottom surface of the cutting insert to define an exposed area and the outlet opening can be provided in the exposed area, facilitating directing fluid toward the cutting edge.

In accordance with yet another aspect of the invention, a method for making an anvil for a cutting tool comprises forming an anvil body having a curved passage that extends from an inlet opening in the anvil body to an outlet opening in the anvil body.

The method provides options for providing fluid to cool and/or lubricate a cutting insert, and/or flush chips away from a workpiece that are not possible or are only possible via passages in anvils having complex geometries when passages extend along straight lines. The method provides additional geometry options for providing a coolant/lubrication/flushing beam from below a cutting insert without advanced drilling or blind plugging operations.

In accordance with still a further aspect, the anvil body can be formed via an additive manufacturing process. By forming an anvil via an additive manufacturing process, an anvil having a complex shape, particularly a complex interior geometry such as including a curved passage, can be formed. Moreover, such an anvil can be formed at minimal cost.

In according with yet another aspect, a cutting tool including an anvil as described is provided.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1:
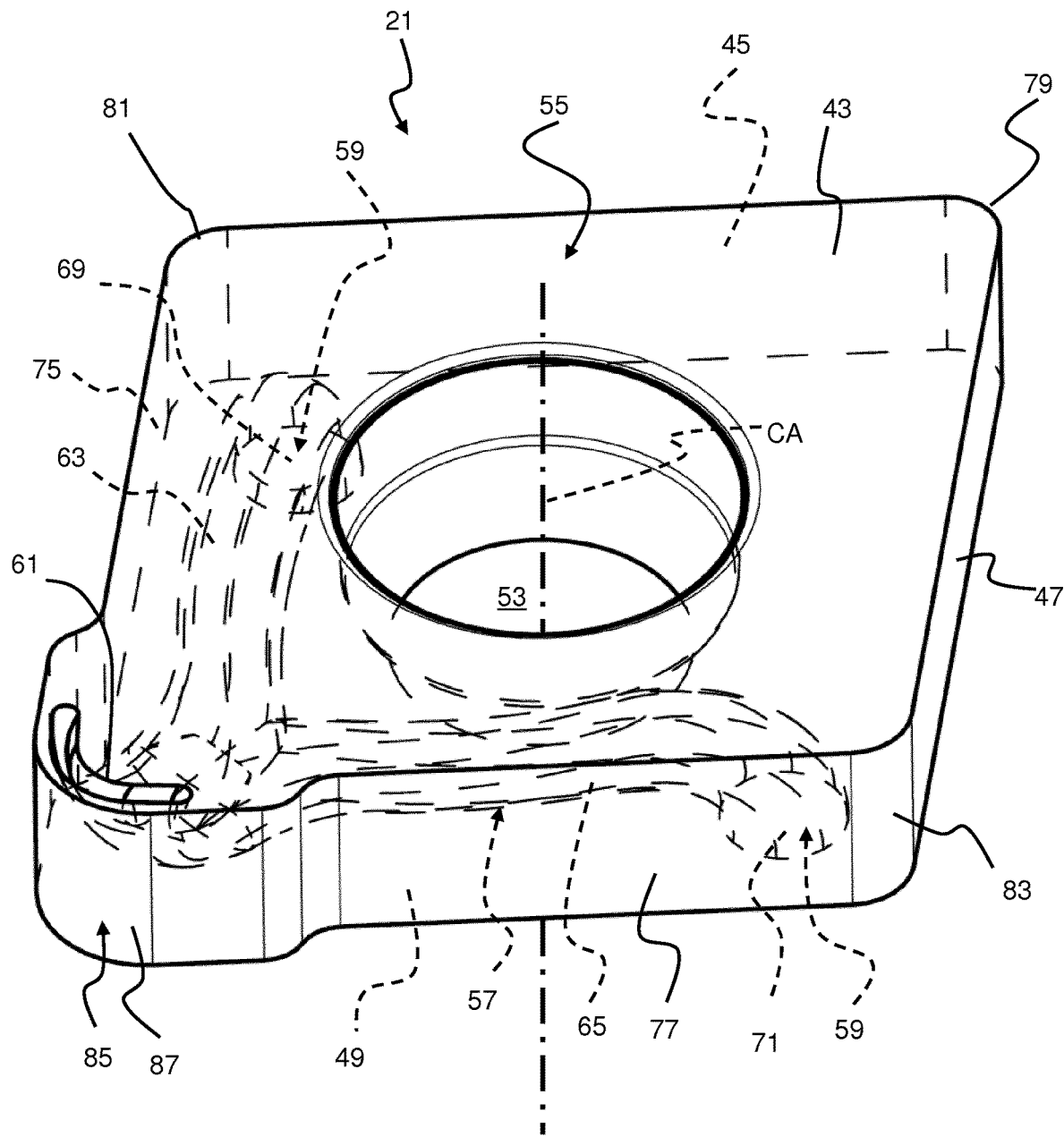
FIGS. 1-4 are a perspective, a top, a side, and a bottom view of an anvil according to an aspect of the present invention.
Figure 2:
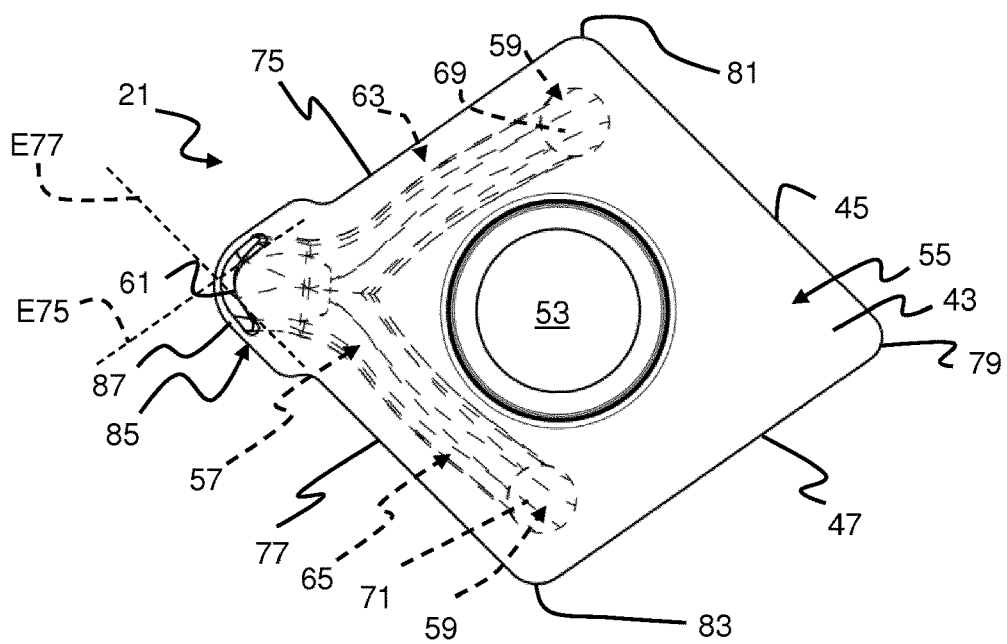
Figure 3:
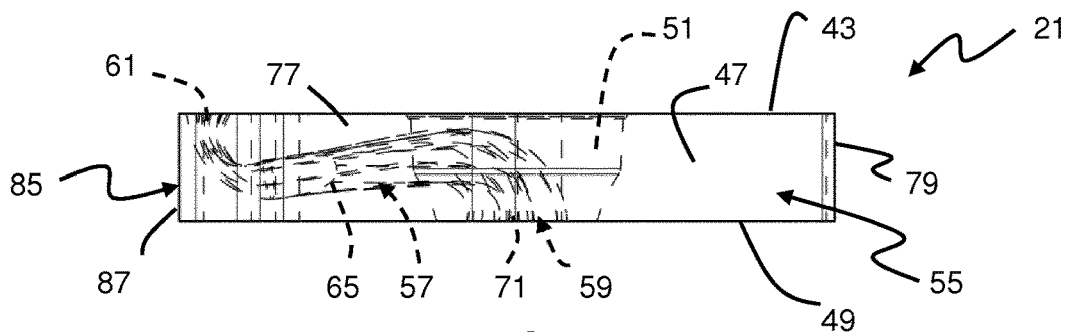
Figure 4:
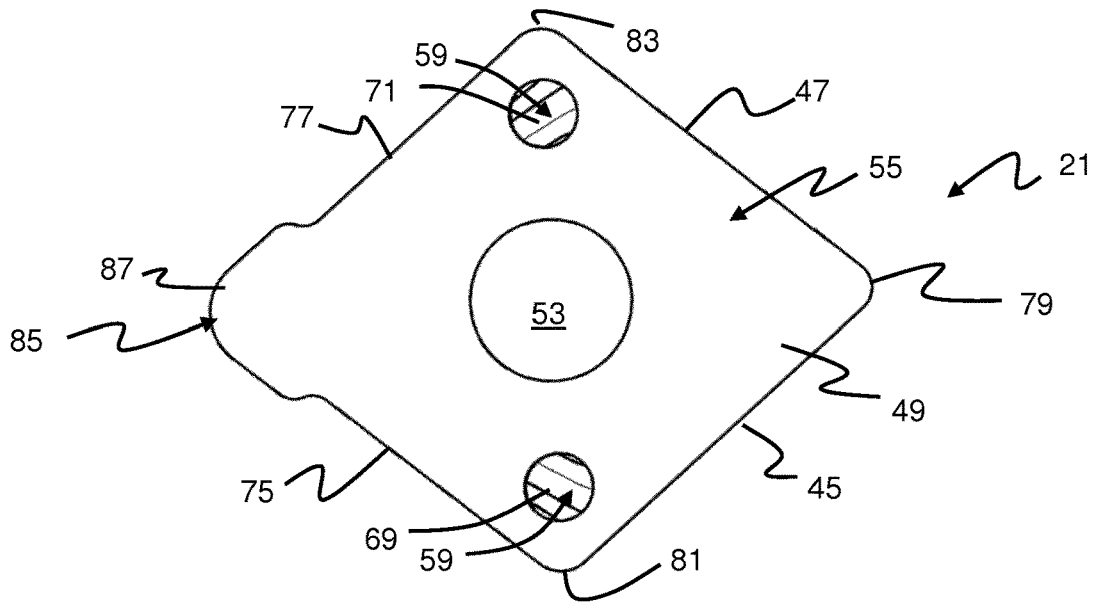
Figure 5:
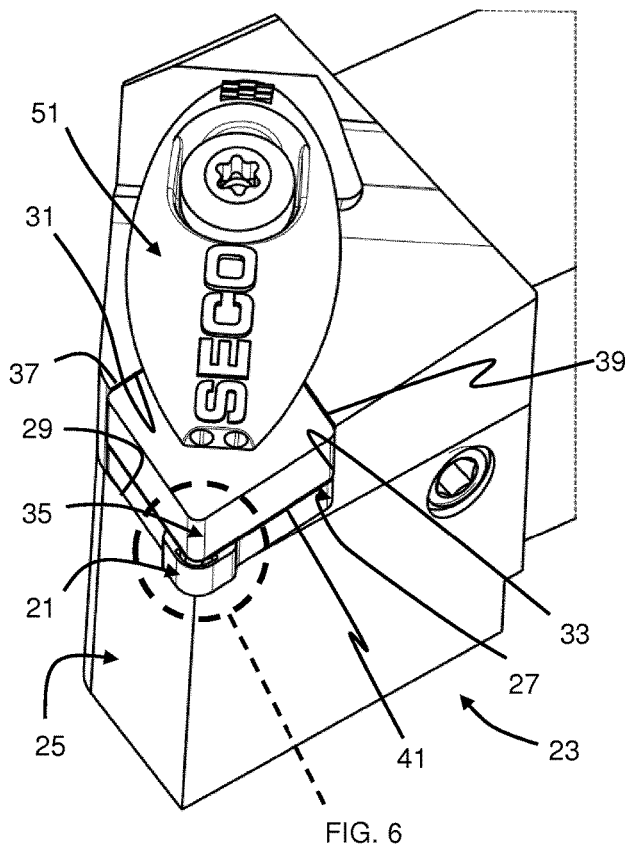
FIG. 5 is a perspective view of a cutting tool including an anvil according to an aspect of the present invention.
Figure 6:
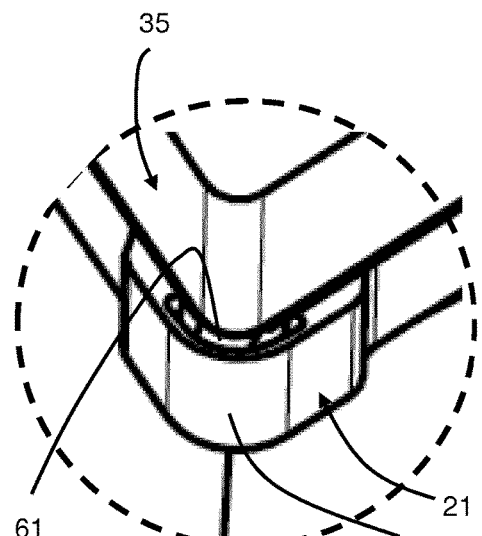
FIG. 6 is an enlarged view of a portion of FIG. 5.
Figure 7:
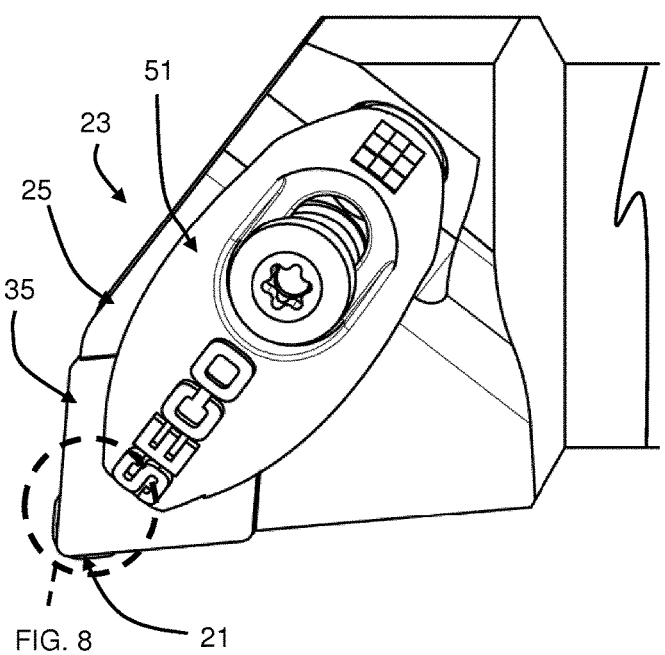
FIG. 7 is a top view of the cutting tool including an anvil according to an aspect of the present invention.
Figure 8:
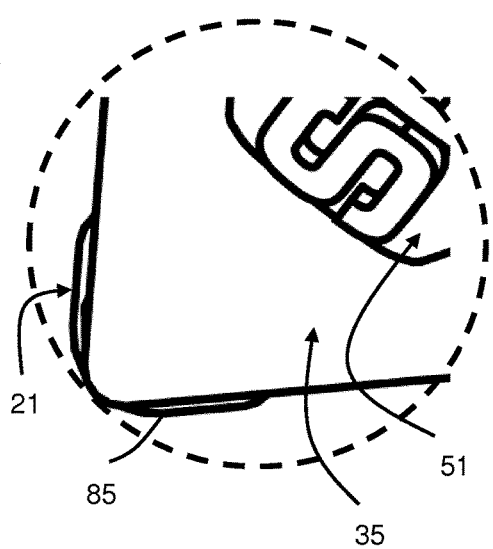
FIG. 8 is an enlarged view of a portion of FIG. 7.

EP2946857A1, however, only provides a fluid passage through the anvil that is in a straight line. A passage having a straight line structure limits options available for providing fluid by the cutting edge. For example, in the event that the anvil is secured to the toolholder by a bolt or other structure extending through a hole in the anvil, the hole may make it impossible to provide a passage that extends along a straight line. Forming a passage that goes around the hole may require several manufacturing steps such as advanced drilling and/or blind plugging operations, adding to the cost of the cutting insert.

FIGS. 1-4 in the present patent application show an anvil 21 for a cutting tool 23 of the type shown in FIGS. 5-8. The cutting tool 23 illustrated in FIGS. 5-8 is a turning tool, however, the invention is not limited to turning tools and may be applicable to other tools that use anvils (also referred to as shims), such as rotating tools, such as milling tools. As seen, for example, in FIG. 5, the cutting tool 23 has a tool body or toolholder 25 in which a recess 27 is provided. The recess 27 can include a bottom abutment surface 29, and two side abutment surfaces 31 and 33. A cutting insert 35 is mounted in the recess 27 on top of the anvil 21. Typically, side supporting surfaces 37 and 39 of the cutting insert 35 abut the side abutment surfaces 31 and 33 of the recess 27, and a bottom supporting surface 41 of the cutting insert abuts a top surface, also referred to as a top abutment surface, 43 (FIG. 1) of the anvil 21. Side surfaces, also referred to as side supporting surfaces, 45 and 47 of the anvil 21 typically abut the side abutment surfaces 31 and 33 of the recess, and a bottom surface, also referred to as a bottom supporting surface, 49 (FIG. 4) of the anvil abuts the bottom abutment surface 29 of the recess 27. A clamp 51 is provided to clamp the cutting insert 35 in the recess 27. The clamp 51 may also clamp the anvil 21 in the recess 27. Alternatively, the anvil 21 may be clamped in the recess 27 by a clamping arrangement separate from the clamp 51 that clamps the cutting insert 35. For example, the anvil 21 may be clamped in the recess 27 by a screw or bolt that extends through a central opening 53 in the anvil while the insert may be clamped by a separate clamp 51, such as the cantilever clamping assembly shown.

Figure 9A:
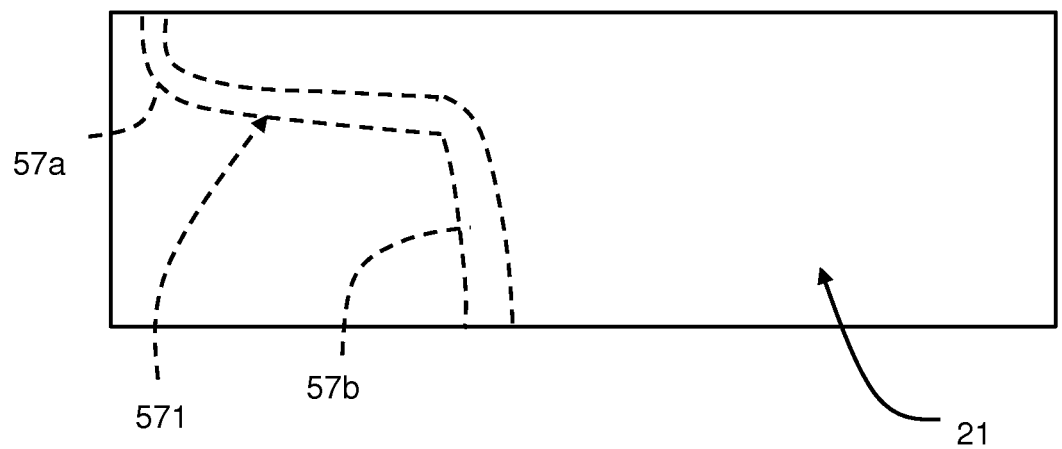
FIGS. 9A and 9B are side views of anvils according to further aspects of the present invention.
Figure 9B:
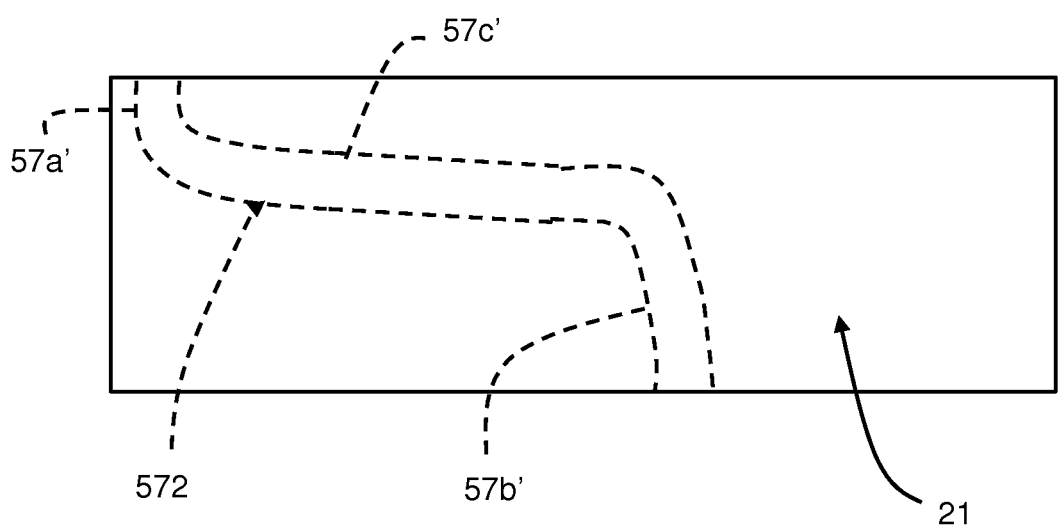

As seen in FIGS. 1-4, the anvil 21 comprises an anvil body 55, and a curved passage 57 extends from an inlet opening 59 in the anvil body to an outlet opening 61 in the anvil body. In the embodiment shown in FIGS. 1-4, the curved passage 57 extends from an inlet opening 59 in the bottom surface 49 of the anvil 21 to an outlet opening 61 in the top surface 43 of the anvil. The expression "curved passage" is expressly defined herein as referring to passages that are not straight over their length and is particularly to be contrasted to a passage made up only of one straight portion, or more than one connected straight portions. Ordinarily, a "curved passage" will have a mathematically continuous curvature, however, it may comprise plural discontinuous mathematically continuously curved components as shown in FIGS. 9A and 9B, including plural curved components 57a and 57b that are adjacent to each other to form a curved passage 571 as shown in FIG. 9A and plural curved components 57a' and 57b' that are separated by a straight component 57c' to form a curved passage 572 as shown in FIG. 9B. A "curved passage" will transit sufficiently smoothly to provide minimal risk for clogging and/or significant pressure drop. The cross-sectional area of the passages may change, typically becoming smaller as the passage transits from its inlet opening(s) 59 to its outlet opening (s) 61. The inlet opening 59 of the curved passage 57 will typically connect to a passage (not shown) in the toolholder 25 or elsewhere so that fluid can enter the passage and pass to the outlet opening 61, usually for flushing chips from the cutting edge of the cutting insert 35 and/or for cooling the cutting edge.

Figure 10:
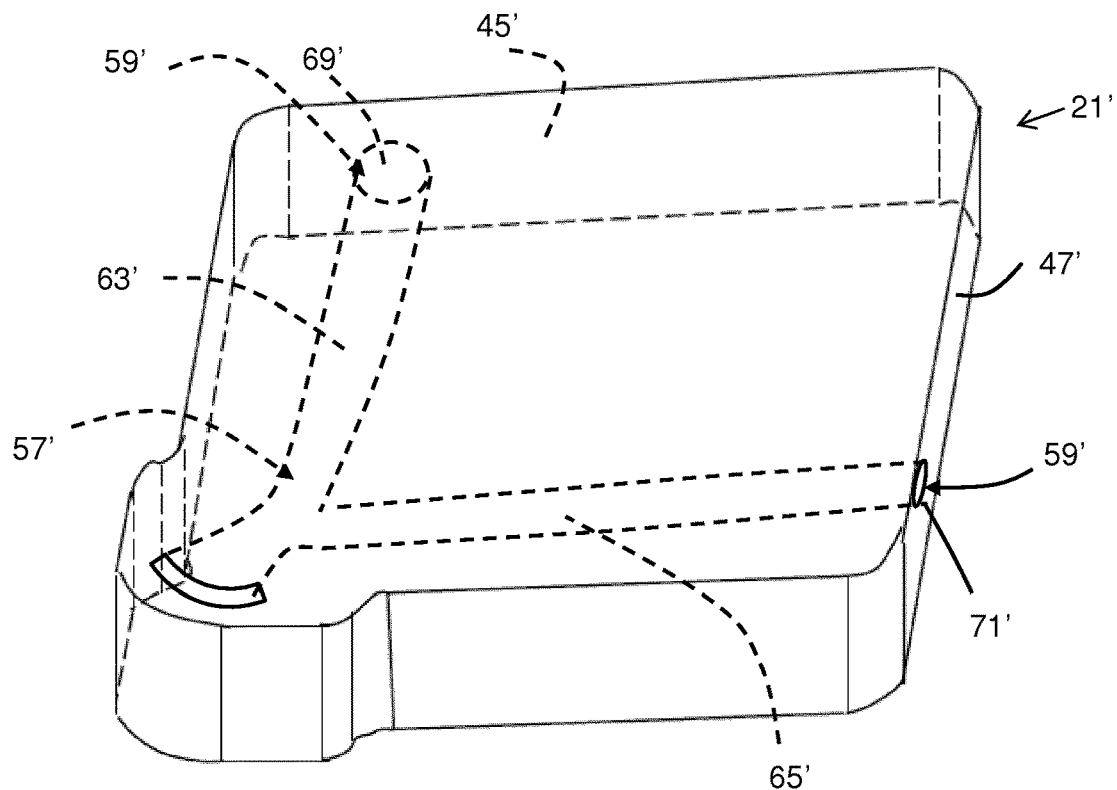
FIG. 10 is a perspective view of an anvil according to another aspect of the present invention.
Figure 11:
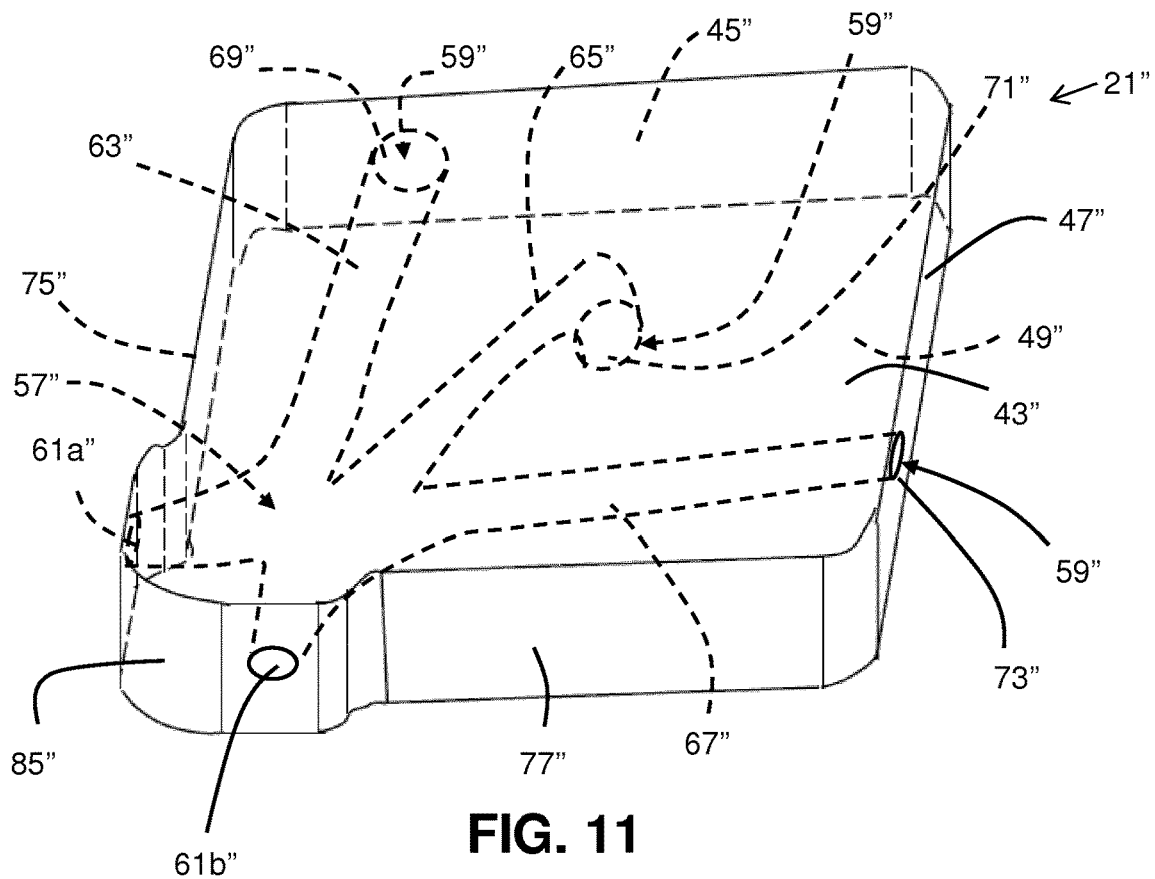
FIG. 11 is a perspective view of an anvil according to yet another aspect of the present invention.

In addition to or instead of having a curved passage that extends from an inlet opening in the bottom surface 49 of the anvil 21' to an outlet opening in the top surface 43 of the anvil, the curved passage 57' may extend from an inlet opening 59' in the side surface 45' and/or 47' of the anvil as seen in FIG. 10. In addition to or instead of having a curved passage that extends from an inlet opening in the bottom surface 49 of the anvil 21" to an outlet opening in the top surface 43 of the anvil, the curved passage 57" may extend to an outlet opening 61a" or 61b" in the side surface 75" and/or 77" of the anvil as seen in FIG. 11. In addition to the anvil 21 having one or more curved passages, the anvil may also include one or more straight passages (not shown).

As seen in FIGS. 1-4, the passage 57 can have at least two branches. The anvil 21 comprises the central hole 53, the passage 57 comprises plural branches 63 and 65, and the inlet opening 59 comprises plural inlet openings 69 and 71, respectively. The first inlet opening 69 of the first branch 63 is disposed on a first side of the central hole 53, and the second inlet opening 71 of the second branch 65 is disposed on a second side of the central hole opposite from the first branch.

If desired, one or more inlet openings (not shown) may be provided in the central hole so that fluid can flow through the central hole into the inlet openings and then through the curved passage.

In the anvil 21' shown in FIG. 10, the passage 57' comprises plural branches 63' and 65', and the inlet opening 59' comprises plural inlet openings 69' and 71'. The first inlet opening 69' of the first branch 63' is disposed in a first side surface 45' of the anvil, and the second inlet opening 71' of the second branch 65' is disposed in a second side surface 47' of the anvil different from the first side surface.

To illustrate the variety of curved passage configurations possible, in the anvil 21" shown in FIG. 11, the passage 57" comprises plural branches 63", 65", and 67", and the inlet opening 59" comprises plural inlet openings 69", 71", and 73". The first inlet opening 69" of the first branch 63" is disposed in the side surface 45" of the anvil, and the second inlet opening 71" of the second branch 65" is disposed in the bottom surface 49" of the anvil, and the third inlet opening 73" of the third branch 67" is disposed in the side surface 47". The outlet openings 61a" and 61b" are disposed in the side surfaces 75" and 77" (considering portions of the corner portion 85" to be part of these side surfaces), respectively, however, they might alternatively or additionally be disposed in the top surface 43". There may be a different number of outlet openings than inlet openings, and there may be more outlet openings than inlet openings or vice versa. The outlet opening(s) will ordinarily be disposed in at least one of the side surface and the top surface and the inlet opening(s) will ordinarily be disposed in at least one of the bottom surface and the side surface, however, an outlet opening might be disposed in the bottom surface and an inlet opening might be disposed in a top surface.

Referring, for purposes of discussion, to FIG. 1, it will be seen that the anvil 21 can have plural side surfaces 45 and 47. Typically, an anvil with plural side surfaces will have at least three side surfaces defined by corners or corner portions, i.e., will be substantially triangular, or will have more sides, such as the four sides illustrated in the anvil of FIG. 1. In the anvil 21, there are four straight side surfaces 45, 47, 75, and 77 and four corner portions 79, 81, 83, and 85 disposed between pairs of the side surface portions. At least one corner portion 85 of the at least three corner portions comprises a surface 87 that extends radially outward from a central axis CA (FIG. 1) of the anvil 21 relative to extensions of the pair of side surface portions 75 and 77 separated by the corner portion 85, the central axis extending between the top surface and the bottom surface. By "extensions of the pair of side surface portions 75 and 77" it is intended to refer to the surfaces that would be defined if the side surface portions 75 and 77 were extended beyond where they are shown as ending and the corner portion 85 starts in FIG. 2, and illustrated by two dashed, straight lines E75 and E77 therein. The dashed, straight lines may intersect within the periphery of the anvil. By providing the corner portion 85 with the surface portion 87 that extends outwardly in this fashion, a portion of the top surface 43 of the anvil 21 can extend beyond the bottom supporting surface 41 of the cutting insert 35 as shown in FIGS. 5-8. The outlet opening 61 can be provided in this portion of the top surface 43 to facilitate providing cooling/flushing fluid to the cutting edge above the cover portion 85.

Figure 12:
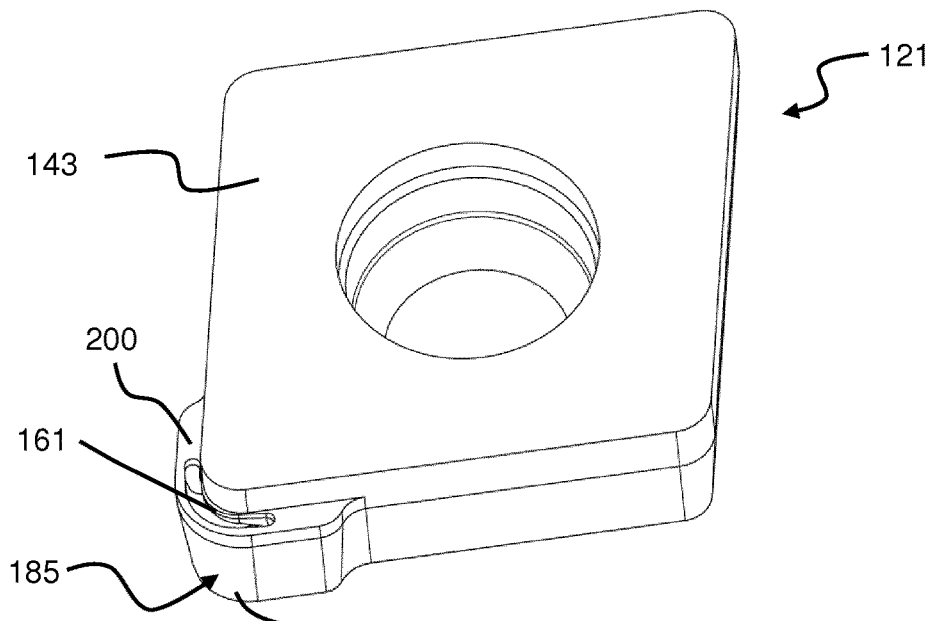
FIGS. 12-14 are a perspective, top, and side view of an anvil according to still yet another aspect of the present invention.
Figure 13:
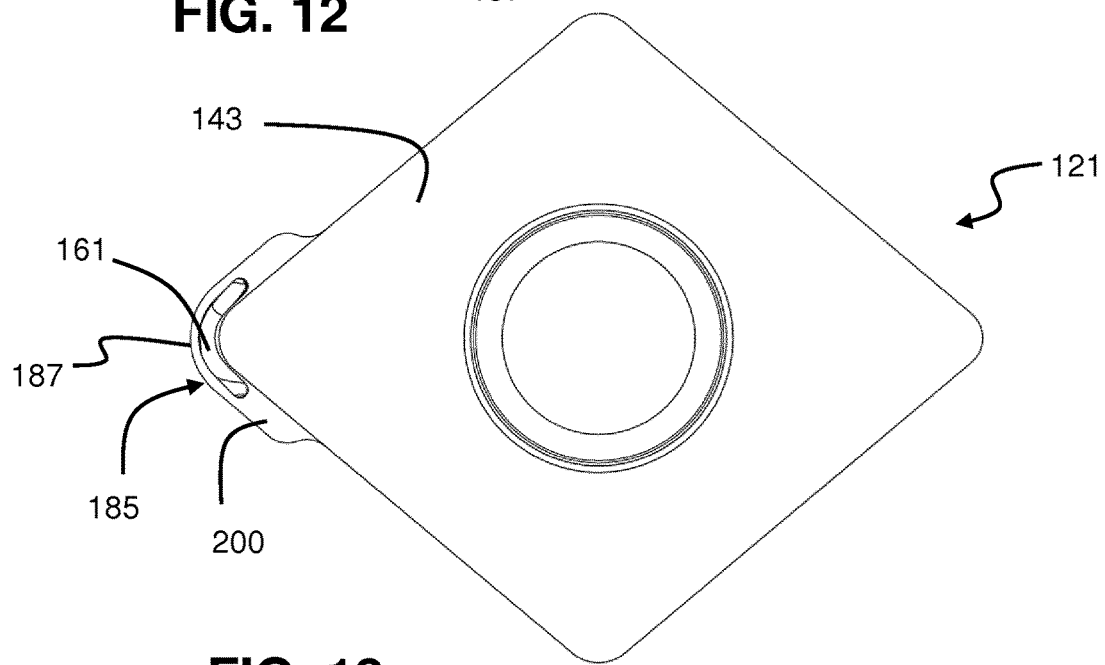
Figure 14:
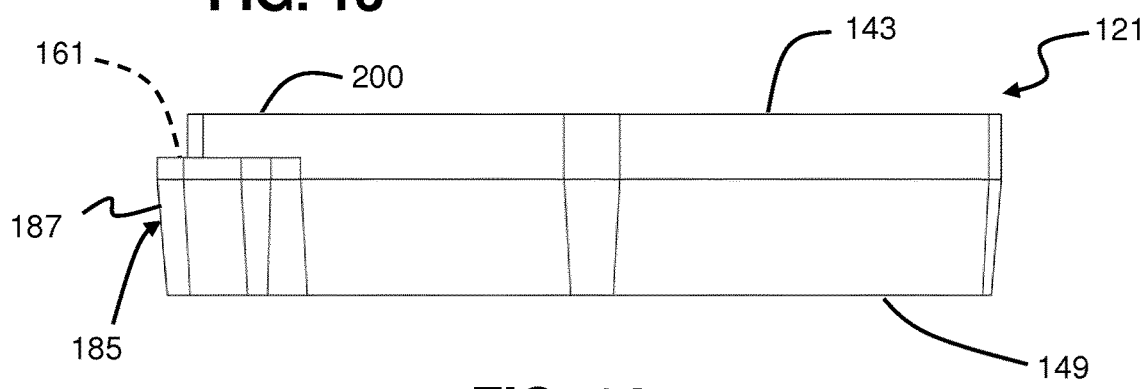

FIGS. 12-14 show an anvil 121 according to another aspect of the invention in which an intermediate surface 200 is provided on a protruding corner 185 of the anvil. An outlet opening 161 can be provided in the intermediate surface 200. Inlet openings (not shown) and other outlet openings (not shown) can be provided in any other surfaces as desired. The intermediate surface 200 is disposed below the top surface 143 and above the bottom surface 149, although the intermediate surface may extend to the top surface and/or the bottom surface. As illustrated, a plane of the intermediate surface 200 is parallel to a plane of the top surface 143 and a plane of the bottom surface 149 (FIG. 3), however, the intermediate surface may form a non-zero angle with planes of the top or bottom surfaces and/or may be curved. Providing an intermediate surface 200 in which an outlet opening 161 can be provided between the top and bottom surfaces 143 and 149 and, more particularly, below the top surface, can facilitate providing workpiece clearance when the anvil 121 is used with thinner cutting inserts, negative inserts, or toolholders with small rake and/or inclination angles. The surface 187 of the protruding corner 185 may be at the same inclination angle as the rest of the side surface(s) of the anvil at a different inclination angle from some or all of the rest of the side surface(s) of the anvil.

Tool life generally increases with increase in coolant supply pressure. This can be attributed to the ability of the high-pressure coolant to lift the chip and gain access closer to the cutting interface. This action leads to a reduction of the seizure region, thus lowering the friction coefficient, which in turn results in reduction in cutting temperature and cutting forces. Preferably the pressure used in the discussed embodiments is above 30 bar, and more preferably above 100 bar coolant pressure.

In another aspect of the invention, a method for making an anvil 21 for a cutting tool 23 comprises forming an anvil body 55 having a curved passage 57 that extends from an inlet opening 59 in the anvil body to an outlet opening 61 in the anvil body. The anvil body 55 can be formed via any suitable one of a plurality of different additive manufacturing processes such as metal 3D printing processes that use binders, or fully dense metal processes such as selective laser sintering (SLS) or direct metal laser sintering (DMLS). DMLS technology, for example, uses a high power laser to fuse small particles of metal powders into a shim or anvil that has a desired three dimensional shape. A laser beam "draws" directly on the powder so that only selected portions of the powder are solidified. The powder is said to be "scanned" by the laser. The use of a laser in this manner allows layers of different shape to be easily and rapidly fused, enabling complex objects with intricate internal structures to be produced. The laser selectively fuses the powdered metal by scanning the cross-sections (or layers) generated by a three dimensional modeling program on the surface of a powder bed. After each cross-section is scanned, the powder bed is lowered by one layer thickness. Then a new layer of material is applied on top and the process is repeated until the shim is completed. Such a process makes it possible to produce complex anvils with shapes such as curved passages. Thus, the curved passage exhibits a continuous course, which is optimized from the point of view of flow engineering and which can be produced, for example, by means of an additive manufacturing process. Machining subsequent to additive manufacturing may also be performed.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

The curved passage is to be distinguished from a groove or a curved groove in a surface of the anvil. The curved passage is curved along its length, and is tubular in that the wall or walls of the curved passage extend entirely around a longitudinal axis of the passage.

While this invention has been illustrated and described in accordance with a preferred embodiment, it is recognized that variations and changes may be made therein without departing from the invention as set forth in the claims.

The invention claimed is:

1. A cutting tool comprising:
a toolholder, the toolholder having a recess;
an anvil mounted in the recess, wherein the anvil includes an anvil body; and
a cutting insert mounted in the recess on top of the anvil, the anvil body having a top surface, a bottom surface, a central axis extending between the top surface and the bottom surface, and a side surface disposed between the top surface and the bottom surface, the side surface having at least three side surface portions and at least three corner portions, each corner portion of the at least three corner portions being disposed between a respective pair of side surface portions of the at least three side surface portions, wherein a curved passage extends from an inlet opening in the anvil body to an outlet opening in the anvil body, wherein at least one corner portion of the at least three corner portions includes a surface extending radially outward from the central axis of the anvil relative to extensions of the respective pair of side surface portions of the at least three side surface portions, such that a limited portion of the top surface of the anvil extends past a bottom surface of the cutting insert to define an exposed area and wherein the outlet opening is arranged in the exposed area to direct fluid toward the cutting edge.

2. The cutting tool as set forth in claim 1, wherein the curved passage extends from the inlet opening in the bottom surface.

3. The cutting tool as set forth in claim 1, wherein the curved passage extends from the inlet opening in the side surface.

4. The cutting tool as set forth in claim 1, wherein the curved passage extends to the outlet opening in the top surface.

5. The cutting tool as set forth in claim 1, wherein the curved passage extends to the outlet opening in the side surface.

6. The cutting tool as set forth in claim 1, wherein the anvil body includes a central hole, the curved passage having a plurality of branches, and the inlet opening having a plurality of inlet openings, wherein a first inlet opening of a first branch of the plurality of branches is disposed on a first side of the central hole, and wherein a second inlet opening of a second branch of the plurality of branches is disposed on a second side of the central hole opposite from the first branch.

7. The cutting tool as set forth in claim 1, wherein the curved passage has a plurality of branches, and the inlet opening has a plurality of inlet openings, wherein a first inlet opening of a first branch of the plurality of branches is disposed in a first side surface of the anvil, and wherein a second inlet opening of a second branch of the plurality of branches is disposed in a second side surface of the anvil opposite from the first side surface.

8. The cutting tool as set forth in claim 1, wherein the curved passage has a plurality of branches, and the inlet opening has a plurality of inlet openings, wherein a first inlet opening of a first branch of the plurality of branches is disposed in a bottom surface of the anvil, and wherein a second inlet opening of a second branch of the plurality of branches is disposed in a side surface of the anvil.

9. The cutting tool as set forth in claim 1, wherein the curved passage has a plurality of branches, and wherein the inlet opening has a plurality of inlet openings.

10. A method for making an anvil for a cutting tool according to claim 1, the method comprising:
    forming an anvil body having a curved passage that extends from an inlet opening in the anvil body to an outlet opening in the anvil body.

11. The method as set forth in claim 10, comprising forming the anvil body via an additive manufacturing process.

* * * * *